(12) United States Patent
Iida

(10) Patent No.: US 8,362,129 B2
(45) Date of Patent: Jan. 29, 2013

(54) ROOM-TEMPERATURE-CURABLE POLYORGANOSILOXANE COMPOSITION

(75) Inventor: Isao Iida, Tokyo (JP)

(73) Assignee: Momentive Performance Materials Japan LLC, Tokyo (JP)

(*) Notice: Subject to any disclaimer, the term of this patent is extended or adjusted under 35 U.S.C. 154(b) by 289 days.

(21) Appl. No.: 12/808,557

(22) PCT Filed: Dec. 17, 2008

(86) PCT No.: PCT/JP2008/072996

§ 371 (c)(1),
(2), (4) Date: Jun. 16, 2010

(87) PCT Pub. No.: WO2009/078441

PCT Pub. Date: Jun. 25, 2009

(65) Prior Publication Data

US 2011/0124788 A1    May 26, 2011

(30) Foreign Application Priority Data

Dec. 19, 2007  (JP) .................. 2007-327487

(51) Int. Cl.
C08K 3/10 (2006.01)

(52) U.S. Cl. ........ 524/403; 524/493; 524/534; 524/547; 524/102; 523/213

(58) Field of Classification Search .................... 524/403
See application file for complete search history.

(56) References Cited

U.S. PATENT DOCUMENTS

| 4,714,733 A | * | 12/1987 | Itoh et al. | 524/493 |
| 5,300,611 A | * | 4/1994 | Fujioka et al. | 528/14 |
| 2006/0173126 A1 | | 8/2006 | Araki | |

FOREIGN PATENT DOCUMENTS

| EP | 0 488 204 A2 | 6/1992 |
| JP | 05-125285 A | 5/1993 |
| JP | 2006-160939 | * 6/2003 |
| JP | 2005-105235 A | 4/2005 |
| JP | 2005-162974 A | 6/2005 |
| JP | 2006-160939 A | 6/2006 |
| JP | 2006-182935 A | 7/2006 |
| JP | 2006-213780 A | 8/2006 |
| JP | 2007-119768 A | 5/2007 |
| JP | 2007-284687 A | 11/2007 |
| JP | 2008-274189 A | 11/2008 |
| WO | WO 2007/037552 A2 | 4/2007 |

OTHER PUBLICATIONS

Machine translation of JP 2006-160939.*
Translation of International Preliminary Report on Patentability of PCT/JP2008/072996, dated Sep. 2, 2010, 5 pages.

* cited by examiner

Primary Examiner — Doris Lee
(74) Attorney, Agent, or Firm — Foley & Lardner LLP

(57) ABSTRACT

A room-temperature-curable polyorganosiloxane composition includes: 100 parts by mass of polyorganosiloxane capped with hydroxyl groups at termini and having a viscosity (23° C.) of 0.02 to 1000 Pa·s; 1 to 200 parts by mass of a filler capable of imparting flame retardancy; 0.1 to 10 parts by mass of a partially hydrolyzed condensate of a silane compound of $R^1{}_a Si(OR^2)_{4-a}$ wherein $R^1$('s) and $R^2$('s) independently represent a substituted/unsubstituted univalent hydrocarbon group, and 'a' represents a numerical value of $0 \leq a \leq 0.2$ on average; 0.1 to 10 parts by mass of a silane compound of $R^3{}_2 Si(OR^4)_2$ wherein $R^3$'s and $R^4$'s) independently represent a substituted/unsubstituted univalent hydrocarbon group, or its partially hydrolyzed condensate having 3 or less Si atoms in its molecule; 0.1 to 10 parts by mass of an amine-functionalized silane compound of $(R^5 O)_3 Si$—$R^6$—$NH$—$R^7$ wherein $R^5$'s independently represent a substituted/unsubstituted univalent hydrocarbon group, $R^6$ represents a substituted/unsubstituted bivalent organic group, and $R^7$ represents a hydrogen atom, a substituted/unsubstituted univalent hydrocarbon group, or an aminoalkyl group; 0.001 to 10 parts by mass of a curing catalyst; and 1 to 1000 ppm of a platinum compound (in terms of the Pt content).

4 Claims, No Drawings

ROOM-TEMPERATURE-CURABLE POLYORGANOSILOXANE COMPOSITION

TECHNICAL FIELD

The present invention relates to a room-temperature-curable polyorganosiloxane composition of a condensation reaction type that cures at room temperature into a rubber-like elastic body.

BACKGROUND ART

A polyorganosiloxane composition of a condensation reaction type that cures at room temperature into a rubber-like elastic body is in wide use as an elastic adhesive, a coating material, an electrical insulation sealant, and the like in an electric and electronic industry and also as a building sealant or the like.

Among such room-temperature-curable polyorganosiloxane compositions of the condensation reaction type, that of a single-component type (or single-package type) in which a curing reaction takes place when it comes into contact with moisture in the air is easy to handle because it does not require a troublesome work of weighing and mixing a base polymer and a cross-linking agent, a catalyst, or the like immediately before use. However, since its curing gradually progresses inward from its surface, it has a drawback of slow curing speed and poor deep-part curability.

On the other hand, a room-temperature-curable polyorganosiloxane composition of a two-component type is higher in curing speed and higher in deep-part curability than the single-component type. Generally, this composition is used as a composition of a so-called multi-package-type of which room-temperature-curable base composition and cross-linking composition are separately prepared, are preserved in separate containers, and are mixed immediately before use. The base composition comprises polydiorganosiloxane having termini capped with hydroxyl and/or alkoxyl groups and an inorganic filler. The cross-linking composition comprises a cross-linking agent and a curing catalyst (see, for example, a Patent Reference 1).

However, the conventional room-temperature-curable polyorganosiloxane composition of the two-component type is poor in adhesiveness to various kinds of substrates, and in particular, when the composition is added with zinc carbonate, aluminum hydroxide, or the like to impart flame retardancy, its hardness may increase due to an increase in an amount of a filler, resulting in poorer adhesiveness.

Patent Reference 1: JP-A 2005-105235 (KOKAI)

DISCLOSURE OF THE INVENTION

The present invention was made to solve the above problem of the conventional art, and its object is to provide a room-temperature-curable polyorganosiloxane composition having good curability, flame retardancy and excellent adhesiveness to various substrates.

A room-temperature-curable polyorganosiloxane composition of the present invention includes:

(A) 100 parts by mass of polyorganosiloxane capped with hydroxyl groups at molecular chain termini and having a viscosity at 23° C. of 0.02 to 1000 Pa·s;

(B) 1 to 200 parts by mass of a filler capable of imparting flame retardancy;

(C) 0.1 to 10 parts by mass of a partially hydrolyzed condensate of a silane compound of a general formula (1):

$$R^1_a Si(OR^2)_{4-a} \tag{1}$$

wherein $R^1$ and $R^2$ independently represent a substituted or unsubstituted univalent hydrocarbon group, and 'a' represents a numerical value in the range of $0 \leq a \leq 0.2$ on average;

(D) 0.1 to 10 parts by mass of a silane compound of a general formula (2):

$$R^3_2 Si(OR^4)_2 \tag{2}$$

wherein $R^3$ and $R^4$ independently represent a substituted or unsubstituted univalent hydrocarbon group, or a partially hydrolyzed condensate of the silane compound having 3 or less Si atoms in its molecule;

(E) 0.1 to 10 parts by mass of an amine-functionalized silane compound of a general formula (3):

$$(R^5O)_3Si-R^6-NH-R^7 \tag{3}$$

wherein $R^5$'s independently represent a substituted or unsubstituted univalent hydrocarbon group, $R^6$ represents a substituted or unsubstituted bivalent organic group, and $R^7$ represents a hydrogen atom, a substituted or unsubstituted univalent hydrocarbon group, or an aminoalkyl group;

(F) 0.001 to 10 parts by mass of a curing catalyst; and (G) 1 to 1000 ppm of a platinum compound (in terms of the platinum content).

In an embodiment of the present invention, the (C) component may contain 1 to 15 mols of the $OR^2$ group per mol of the hydroxyl group in the (A) component.

In another embodiment of the present invention, the (D) component may contain 0.1 to 15 mols of the $OR^4$ group per mol of the $OR^2$ group in the (C) component.

In another embodiment of the present invention, the (B) component may contain zinc carbonate.

According to the present invention, there is provided a room-temperature-curable polyorganosiloxane composition having good curability, flame retardancy and excellent adhesiveness to various substrates.

BEST MODE FOR CARRYING OUT THE INVENTION

An embodiment of the present invention will be described.

Polyorganosiloxane, an (A) component of a room-temperature-curable polyorganosiloxane composition of the present invention, is capped with hydroxyl groups at molecular chain termini. In particular it is substantially linear polyorganosiloxane of the following general formula (4).

[chemical formula 1]

$$\text{HO}-(\underset{\underset{R^8}{|}}{\overset{\overset{R^8}{|}}{Si}}O)_n\text{H} \tag{4}$$

In the formula (4), $R^8$'s are independently a substituted or unsubstituted univalent hydrocarbon group. Examples of $R^8$ are alkyl groups such as methyl, ethyl, propyl, butyl, pentyl, hexyl, octyl, decyl, and dodecyl; cycloalkyl groups such as cyclohexyl; alkenyl groups such as vinyl and allyl; aryl groups such as phenyl, tolyl, and xylyl; aralkyl groups such as benzyl, 2-phenylethyl, and 2-phenylpropyl; and any of these hydrocarbon groups in which part of hydrogen atoms are substituted by other atoms such as halogen atoms or by other groups, for example alkyl halide groups such as chloromethyl, 3-chloropropyl, and 3,3,3-trifluoropropyl, and cyanoalkyl groups such as 3-cyano-propyl. 85% or more of all the organic groups in a polyorganosiloxane are preferably methyl groups, because such polyorganosiloxane is easy to synthesize, because it has a low viscosity relative to its molecular weight, which leads to good extrudability of the composition before cured, and because it imparts a good physical property to the cured composition. More preferably, substantially all the organic groups are methyl groups.

Further, the methyl groups can be used with other groups which can be arbitrarily selected according to a purpose, for example, a desired amount of an aryl group is used as part of $R^8$ in order to impart especially heat resistance, radiation resistance, cold resistance, or transparency, a 3,3,3-trifluoropropyl or 3-cyano-propyl group is used as part of $R^8$ in order to impart oil resistance and solvent resistance, and a long-chain alkyl or aralkyl group is used as part of $R^8$ in order to produce a surface with suitable coatability.

Further, polyorganosiloxane, (A) component, has a viscosity of 0.02 to 1000 Pa·s at 23° C. Therefore, n in the formula (4) is a numerical value (integer) determined so that the viscosity of the (A) component becomes the above range at 23° C. When the viscosity of the (A) component at 23° C. is less than 0.02 Pa·s, a rubber-like elastic body after curing does not expand sufficiently. When the viscosity is over 1000 Pa·s on the contrary, workability such as a discharge property and flowability deteriorate. The viscosity of the (A) component preferably is in the range of 0.1 to 100 Pa·s in order to balance the desired properties of the composition before and after curing.

Such polyorganosiloxane can be prepared in such a manner that, for example, a cyclic diorganosiloxane oligomer such as octamethyl siloxane is ring-opening polymerized or ring-opening copolymerized using an acid or alkaline catalyst in the presence of water.

A filler capable of imparting flame retardancy, a (B) component of the room-temperature-curable polyorganosiloxane composition of the present invention, imparts flame retardancy to the composition and the rubber-like elastic body obtained by curing the composition and also imparts high mechanical strength to the cured composition. Examples of such a filler capable of imparting flame retardancy are zinc carbonate, basic zinc carbonate, aluminum hydroxide, magnesium carbonate, titanium dioxide, silicon dioxide (quartz powder), ceric oxide, any of the surface-treated thereof, and the like. One kind among these may be used alone, or the mixture of two kinds or more of them may be used. For the effective flame retardancy, zinc carbonate, aluminum hydroxyde, and the like are preferably used, and also for the excellent flowability, zinc carbonate is preferably used.

An amount of the filler capable of imparting flame retardancy, the (B) component, maybe to 200 parts by mass, preferably 5 to 100 parts by mass, per 100 parts by mass of the (A) component. When the amount of the filler capable of imparting flame retardancy is less than 1 part by mass, sufficient flame retardancy is not obtained, and when it is over 200 parts by mass on the contrary, mechanical strength after curing and flowability deteriorate.

A (C) component of the room-temperature-curable polyorganosiloxane composition of the present invention may act as a cross-linking agent for the (A) component and is a partially hydrolyzed condensate of a silane compound of a general formula (1):

$$R^1_a Si(OR^2)_{4-a} \quad (1)$$

In the formula (1), $R^1$('s) and $R^2$('s) independently represent a substituted or unsubstituted univalent hydrocarbon group, and examples thereof are alkyl groups such as methyl, ethyl, propyl, butyl, pentyl, hexyl, octyl, decyl, and dodecyl; cycloalkyl groups such as cyclohexyl; alkenyl groups such as vinyl and allyl; aryl groups such as phenyl, tolyl, and xylyl; aralkyl groups such as benzyl, 2-phenylethyl, and 2-phenylpropyl; any of these hydrocarbon groups in which part of hydrogen atoms are substituted by other atoms such as halogen atoms or by other groups, for example alkyl halide groups such as chloromethyl, 3-chloropropyl, and 3,3,3-trifluoropropyl, and cyano-alkyl groups such as 3-cyano-propyl. Further, 'a' represents a numerical value in the range of $0 \leq a \leq 0.2$, preferably, $0 \leq a \leq 0.1$, on average.

The partially hydrolyzed condensate, the (C) component, preferably contains 3 to 20, more preferably 4 to 15 Si atoms in its molecule. When the number of the Si atoms is less than 3, sufficient curability is not obtained, and when it is over 20, curability and mechanical property after curing deteriorate.

As the partially hydrolyzed condensate, the (C) component, one kind may be used alone or the mixture of two kinds may be used from the above list.

An amount of the (C) component may be 0.1 to 10 parts by mass per 100 parts by mass of the (A) component. When it is less than 0.1 parts by mass, sufficient cross-linking does not take place and only a cured body with low hardness can be obtained, and in addition, the composition comprising the cross-linking agent has poor preservation stability. On the contrary, when the amount is over 10 parts by mass, shrinkage percentage by curing may increase and physical properties such as elasticity after curing may deteriorate. Further, for excellent curability, the amount of the (C) component is preferably set so that the (C) component contains 1 to 15 mols, more preferably, 2 to 10 mols, of the $OR^2$ group per mol of the hydroxyl group of the polyorganosiloxane, the (A) component.

A (D) component of the room-temperature-curable polyorganosiloxane composition of the present invention is a silane compound of a general formula (2):

$$R^3_2 Si(OR^4)_2 \quad (2),$$

or a partially hydrolyzed condensate of the silane compound, which is thought to act to impart excellent adhesiveness to the composition together with an (E) component described next.

In the formula (2), $R^3$'s and $R^4$'s independently represent a substituted or unsubstituted univalent hydrocarbon group, and examples thereof are the same groups as the above-mentioned examples of $R^1$ and $R^2$ of the (C) component.

When the partially hydrolyzed condensate is used as the (D) component, the number of Si atoms in its molecule is 2 or 3, and when the number the Si atoms is 4 or more, adhesiveness may become lower and stability may deteriorate. As the (D) component, the use of the silane compound of the above formula (2) is especially preferable.

As the silane compound or its partially hydrolyzed condensate, the (D) component, one kind from the above list may be used alone or the mixture of two kinds or more may be used.

Further, an amount of the (D) component is 0.1 to 10 parts by mass per 100 parts by mass of the (A) component. When it is less than 0.1 parts by mass, an improvement adhesiveness may be limited, and when it is over 10 parts by mass on the contrary, a physical property of cured rubber may deteriorate. For improvement adhesiveness, an amount of the (D) component is preferably set so that the (D) component contains 0.1 to 15 mols, more preferably 0.5 to 10 mols, of the $OR^4$ group per one mol of the $OR^2$ group in the (C) component.

The (E) component of the room-temperature-curable polyorganosiloxane component of the present invention is an amine-functionalized silane compound of a general formula (3):

$$(R^5O)_3Si-R^6-NH-R^7 \quad (3)$$

In the formula (3), $R^5$'s independently represent a different substituted or unsubstituted univalent hydrocarbon group, and examples thereof are the same groups as the above-mentioned examples of $R^1$ and $R^2$ of the (C) component. Further, $R^6$ represents a substituted or unsubstituted bivalent organic group, and examples thereof are alkylene groups such as methylene, ethylene, propylene, tetramethylene, hexamethylene, and methylethylene; arylene groups such as phenylene and tolylene; alkylene arylene groups such as methylenephenylene and methylenephenylene. Further, $R^7$ represents a hydrogen atom, a substituted or unsubstituted univalent hydrocarbon group of a methyl, ethyl, propyl, or butyl group; or an aminoalkyl group such as an aminoethyl or N-aminoethylaminoethyl group.

Suitable examples of the (E) component are as follows.

[Chemical formula 2]

$(CH_3O)_3$—Si—$C_3H_6$—$NH_2$, $(C_2H_5O)_3$—Si—$C_3H_6$—$NH_2$, $(CH_3O)_3$—Si—$C_3H_6$—NH—$C_2H_4NH_2$, $(C_2H_5O)_3$—Si—$C_3H_6$—NH—$C_2H_4NH_2$,

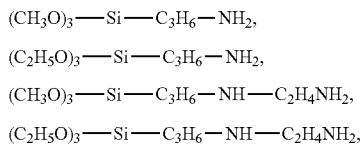

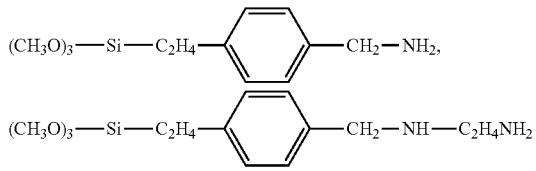

The amine-functionalized silane compound, the (E) component, may be an adduct with acrylic ester or methacrylate ester of the following general formula (5)

[Chemical formula 3]

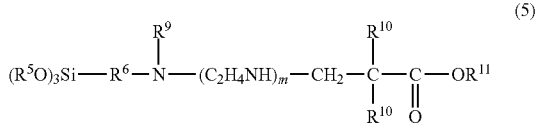

wherein $R^5$ and $R^6$ represent the same groups as above, $R^9$ represents a hydrogen atom or an alkyl group, $R^{10}$'s independently represent a hydrogen atom or a methyl group, and $R^1$ represents any of the same univalent hydrocarbon groups as $R^1$ and $R^2$ described above or any of these groups in which part of the hydrogen atoms are substituted by —$Si(OR^5)_3$, and m is 0, 1, or 2.

Examples of such compounds are as follows.

As the amino-functional silane compound, the (E) component, one kind from the above list may be used alone or the mixture of two kinds or more may be used. As the (E) component, $(CH_3O)_3SiC_3H_6NHC_2H_4NH_2$ and $(C_2H_5O)_3SiC_3H_6NH_2$ may be preferably used A amount of the (E) component is 0.1 to 10 parts by mass, preferably 1 to 5 parts by mass, per 100 parts by mass of the (A) component. When it is less than 0.1 parts by mass, adhesiveness is not fully improved, and when it is over 10 parts by mass on the contrary, a physical property of the cured rubber may deteriorate.

A curing catalyst, an (F) component of the room-temperature-curable polyorganosiloxane composition of the present invention may mainly catalyse a condensation reaction of the hydroxyl groups of the (A) component with a hydrolyzable group of the (C) component, that is, the $OR^2$ groups. Examples of the (F) component are metal carboxylates such as iron octoate, manganese octoate, zinc octoate, tin naphtate, tin caprylate, and tin oleate; organic tin compounds such as dibutyltin diacetate, dibutyltin dioctoate, dibutyltin dilaurate, dibutyltin dioleate, diphenyltin diacetate, dibutyltin oxide, dibutyltin dimethoxide, dibutyl bis (triethoxy siloxy) tin, and dioctyl tin dilaurate; alkoxy titanium compounds such as tetraethoxy titanium, tetrapropoxy titanium, tetrabutoxy titanium, and 1,3-propoxy titanium bis(ethyl acetylacetate); organic aluminum compounds such as aluminum tris-acetylacetonate, aluminum tris-ethyl acetoacetate, diisopropoxy aluminum ethyl acetoacetate, and triethoxy aluminum; organic zirconium compounds such as zirconium tetra acetylacetonate, tetra-isopropoxy zirconium, tetrabutoxy zirconium, tributoxy zirconium acetylacetonate, and tributoxy zirconium stearate. Among them, one kind may be used alone or the mixture of two kinds may be used. An organic tin compound or an alkoxy titanium compound is preferably used because they, even a small amount, have high catalytic activities. The organic tin compound is more preferable.

An amount of the curing catalyst, the (F) component, is 0.001 to 10 parts by mass, preferably 0.01 to 5 parts by mass, per 100 parts by mass of the (A) component. When it is less than 0.001 parts by mass, the activity of the curing catalyst may not be sufficient. As a result it may take long time to be cured, or the curing may become insufficient especially in a deep part of a rubber layer far from a contact surface with the air. When the amount is over 10 parts by mass on the contrary, the (F) component may not work effectively and economically because an effect of catalyst is not improved in accordance with the amount.

Further a platinum compound, a (G) component of the room-temperature-curable polyorganosiloxane composition of the present invention, may improve flame retardancy of the composition and the rubber-like elastic body obtained by curing the composition. Examples of such platinum com-

[Chemical formula 4]

$(CH_3O)_3$—Si—$C_3H_6$—NH—$C_2H_4$—NH—$C_2H_4COOCH_3$,   $(CH_3O)_3$—Si—$C_3H_6$—NH—$C_2H_4COOC_3H_6Si(OCH_3)_3$, $(CH_3O)_3$—Si—$C_3H_6$—NH—$C_2H_4$—NH—$C_2H_4COOC_3H_6Si(OCH_3)_3$   $(CH_3O)_3$—Si—$C_3H_6$—NH—$C_2H_4COOC_2H_5$,

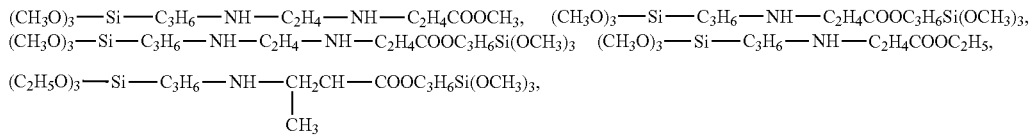

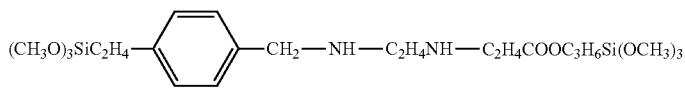

pounds are chloroplatinic acid, alcohol-modified chloroplatinic acid, a complex of platinum and olefin, a complex of platinum and ketones, a complex of platinum and vinyl siloxane, a complex of platinum and a nitrile compound, a complex of phosphoric acid or phosphorous acid and platinum, and the like. Among these platinum compounds, one kind may be used alone or the mixture of two kinds or more may be used.

The platinum compound, the (G) component, may contain 1 to 1000 ppm in terms of the platinum content, more preferably 5 to 100 ppm, per 100 parts by mass of the (A) component. When it is less than 1 ppm, flame retardancy cannot be sufficiently improved, and when it is over 1000 ppm on the contrary, a further effect cannot be obtained economically.

In addition to the above components the room-temperature-curable polyorganosiloxane composition of the present invention may optionally contain, within a range not impairing the effect of the present invention, various additives which has generally blended in this type of composition, for example, an inorganic filler such as dry silica, wet silica, or quartz powder, a pigment, an agent capable of imparting thixotropy, a viscosity controller for improving extrusion workability, an ultraviolet absorbent, a fungicide, a heat-resistance improver, an adhesiveness improver.

The room-temperature-curable polyorganosiloxane composition of the present invention may be prepared by mixing the above-described (A) to (G) components and the various components to be blended when necessary in a moisture-free state room-temperature-curable. The obtained composition can be used as what is called a single-package-type room-temperature-curable composition that is preserved as it is in a hermetic container and is cured only by being exposed to moisture in the air when in use. Further, the composition of the present invention can be also used as what is called a multi-package type room-temperature-curable composition. In this case the composition, for instance, may be divided into two or three compositions, one comprising a cross-linking agent and another comprising a curing agent, which are preserved in separate containers, and are mixed when in use. In particular, a 2-package type composition, is preferably prepared, which is composed of a base composition of the (A), (B), and (G) components and a curing composition of the (C), (D), (E), and (F) components.

The present invention will be described in detail by way of examples, but not by way of limitation of the present invention. In the description below, all physical values such as viscosity were measured under 23° C. and 50% relative humidity.

EXAMPLE 1

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 4 parts by mass of a partially hydrolyzed condensate (having 5 Si atoms) of a silane compound of a formula: $Si(OC_2H_5)_4$, 3 parts by mass of a silane compound of a formula: $(CH_3)_2Si(OC_2H_5)_2$, and 1 part by mass of a silane compound of a formula: $H_2NC_2H_4NHC_3H_6Si(OCH_3)_3$, and was mixed uniformly under a moisture-free state to prepare a polyorganosiloxane composition.

EXAMPLE 2

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 4 parts by mass of a partially hydrolyzed condensate (having 7 Si atoms) of a silane compound of a formula: $Si(OC_2H_5)_4$, 3 parts by mass of a silane compound of a formula: $(CH_3)_2Si(OCH_3)_2$, and 1 part by mass of a silane compound of a formula: $H_2NC_2H_4NHC_3H_6Si(OCH_3)_3$, and was mixed uniformly under a moisture-free state to prepare a polyorganosiloxane composition.

EXAMPLE 3

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 3 parts by mass of a partially hydrolyzed condensate (having 5 Si atoms) of a silane compound of a formula: $Si(OC_2H_5)_4$, 2 parts by mass of a silane compound of a formula: $(CH_3)_2Si(OC_2H_5)_2$, and 0.5 part by mass of a silane compound of a formula: $H_2NC_2H_4NHC_3H_6Si(OCH_3)_3$, and was mixed uniformly under a moisture-free state to prepare a polyorganosiloxane composition.

EXAMPLE 4

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 3 parts by mass of a partially hydrolyzed condensate (having 5 Si atoms) of a silane compound of a formula: $Si(OC_2H_5)_4$, 3 parts by mass of a silane compound of a formula: $(CH_3)_2Si(OC_2H_5)_2$, 1 part by mass of a silane compound of a formula: $H_2NC_2H_4NHC_3H_6Si(OCH_3)_3$, and 1 part by mass of 1,3,5-tris(trimethoxysilylpropyl) isocyanurate, and was mixed uniformly under a moisture-free state to prepare a polyorganosiloxane composition.

EXAMPLE 5

100 Parts by mass of polydimethylsiloxane, which was capped with hydroxyl groups at molecular chain termini (viscosity: 1 Pa·s, an amount of the hydroxyl groups 0.08 mmol/g), was added with 10 parts by mass of polydimethylsiloxane capped with trimethylsilyl groups at molecular chain termini (viscosity: 0.1 Pa·s), 60 parts by mass of zinc carbonate, 50 ppm of chloroplatinic acid (in terms of the platinum content), 0.1 parts by mass of di-n-butyltin dilaurate, 4 parts by mass of a partially hydrolyzed condensate (having 5 Si atoms) of a silane compound of a formula: $Si(OC_2H_5)_4$, 3 parts by mass of a silane compound of a formula: $(CH_3)_2Si(OC_2H_5)_2$, and 1 part by mass of a silane compound of a formula: $H_2NC_2H_4NHC_3H_6Si(OCH_3)_3$, and was mixed uniformly under a moisture-free state to prepare a polyorganosiloxane composition.

COMPARATIVE EXAMPLE 1

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 4 parts by mass of a silane compound of a formula: $Si(OC_2H_5)_4$, 3 parts by mass of a silane compound of a formula: $(CH_3)_2Si(OC_2H_5)_2$/and 1 part by mass of a silane compound of a formula: $H_2NC_2H_4NHC_3H_6Si\ (OCH_3)_3$ and was mixed uniformly under a moisture-free state to prepare a polyorganosiloxane composition.

COMPARATIVE EXAMPLE 2

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 4 parts by mass of a partially hydrolyzed condensate (having 5 Si atoms) of a silane compound of a formula: $Si(OC_2H_5)_4$, 3 parts by mass of a silane compound of a formula: $(CH_3)Si(OC_2H_5)_3$, and 1 part by mass of a silane compound of a formula: $H_2NC_2H_4NHC_3H_6Si\ (OCH_3)_3$, and was mixed uniformly under a moisture-free state to prepare a polyorganosiloxane composition.

COMPARATIVE EXAMPLE 3

100 Parts by mass of polydimethylsiloxane, which was capped with hydroxyl groups at molecular chain termini (viscosity: 1 Pa·s, an amount of the hydroxyl groups 0.08 mmol/g), was added with 60 parts by mass of zinc carbonate, 50 ppm of chloroplatinic acid (in terms of the platinum content), 0.1 parts by mass of di-n-butyltin dilaurate, 4 parts by mass of a partially hydrolyzed condensate (having 5 Si atoms) of a silane compound of a formula: $Si(OC_2H_5)_4$, and 3 parts by mass of a silane compound of a formula: $(CH_3)_2Si(OC_2H_5)_2$, and was mixed uniformly under a moisture-free state to prepare a polyorganosiloxane composition.

By the following methods, various characteristics were evaluated on the polyorganosiloxane compositions, which were prepared in the above-described examples 1 to 5 and comparative examples 1 to 3 and hermetically preserved. The results are shown in Table 1.

[Curability]

Each of the compositions was filled into a die up to a 6 mm thickness at 23° C. and 50% RH, and their states (cured states) were examined after 2, 4, and 8 hours.

[Flame Retardancy]

Each of the compositions was filled into a die and kept at 23° C. and 50% RH for three days, and as a result, cured substances with a 2 mm thickness were obtained. A flame test was conducted on the cured substances based on UL94V.

[Adhesiveness]

Each of the room-temperature-curable polyorganosiloxane compositions was applied in a on various kinds of substrates (PBT (polybutylene terephthalate), PPE (polyphenyleneether)) to form a layer with length of 50 mm, a width of 10 mm and a thickness of 1 mm on various kinds of substrates (PBT (polybutylene terephthalate), PPE (polypheyleneether)), and was cured at 23° C. and 50% RH for three days to obtain samples. Cohesive failure ratios of these samples were measured.

TABLE 1

| | | | example 1 | example 2 | example 3 | example 4 | example 5 | comparative example 1 | comparative example 2 | comparative example 3 |
|---|---|---|---|---|---|---|---|---|---|---|
| composition (part by mass) | hydroxyl group-capped polydimethylsiloxane | | 100 | 100 | 100 | 100 | 100 | 100 | 100 | 100 |
| | trimethylsilyl group-capped polydimethylsiloxane | | — | — | — | — | 10 | — | — | — |
| | zinc carbonate | | 60 | 60 | 60 | 60 | 60 | 60 | 60 | 60 |
| | chloroplatinic acid (in terms of the platinum content) (ppm) | | 50 | 50 | 50 | 50 | 50 | 50 | 50 | 50 |
| | di-N-butyltin dilaurate | | 0.1 | 0.1 | 0.1 | 0.1 | 0.1 | 0.1 | 0.1 | 0.1 |
| | $(CH_3O)_3SiC_3H_6NHC_2H_4NH_2$ | | 1 | 1 | 0.5 | 1 | 1 | 1 | 1 | — |
| | partially hydrolyzed condensate (having 5 Si atoms) of $Si(OC_2H_5)_4$ | | 4 | — | 3 | 3 | 4 | — | 4 | 4 |
| | partially hydrolyzed condensate (having 7 Si atoms) of $Si(OC_2H_5)_4$ | | — | 4 | — | — | — | — | — | — |
| | $(CH_3)_2Si(OC_2H_5)_2$ | | 3 | — | 2 | 3 | 3 | — | — | 3 |
| | $(CH_3)_2Si(OCH_3)_2$ | | — | 3 | — | — | — | — | — | — |
| | $Si(OC_2H_5)_4$ | | — | — | — | — | — | 4 | — | — |
| | $CH_3Si(OC_2H_5)_3$ | | — | — | — | — | — | 3 | 3 | — |
| | 1,3,5-tris(trimethoxysilyl propyl)isocyanurate | | — | — | — | 1 | — | — | — | — |
| characteristic evaluation | curability | after 2 hours | rubber | rubber | rubber | rubber | rubber | uncured (liquid) | uncured (liquid) | rubber |
| | | after 4 hours | rubber | rubber | rubber | rubber | rubber | uncured (liquid) | uncured (liquid) | rubber |
| | | After 8 hours | rubber | rubber | rubber | rubber | rubber | uncured (liquid) | rubber | rubber |
| | flame retardancy [UL-94V] | maximum combustion time (sec) | 3 | 4 | 2 | 5 | 5 | 5 | 7 | 5 |
| | | total combustion time (sec) | 13 | 15 | 10 | 15 | 18 | 20 | 19 | 17 |
| | | rating | V-0 | V-0 | V-0 | V-0 | V-0 | V-0 | V-0 | V-0 |

TABLE 1-continued

|  |  | example 1 | example 2 | example 3 | example 4 | example 5 | comparative example 1 | comparative example 2 | comparative example 3 |
|---|---|---|---|---|---|---|---|---|---|
| adhesiveness [cohesion failure ratio (%)] | PBT | 90 | 90 | 90 | 100 | 100 | 10 | 0 | 0 |
|  | PPE | 80 | 90 | 80 | 100 | 100 | 20 | 20 | 0 |

As is apparent in Table 1, the polyorganosiloxane compositions prepared in the examples 1 to 5 were superior in curability, flame retardancy, and adhesiveness, comparing with the comparative examples 1 to 3. In particular adhesiveness was improved.

EXAMPLE 6

60 Parts by mass of polydimethylsiloxane, which was capped with hydroxyl groups at molecular chain termini (viscosity: 1 Pa·s, an amount of the hydroxyl groups 0.08 mmol/g), was added with 40 parts by mass of zinc carbonate and 50 ppm of chloroplatinic acid (in terms of the platinum content), and was mixed uniformly to prepare a base composition. Further, 1.2 parts by mass of di-n-butyltin dilaurate was added with 49 parts by mass of a partially hydrolyzed condensate (having 5 Si atoms) of a silane compound of a formula: $Si(OC_2H_5)_4$, 37.8 parts by mass of a silane compound of a formula: $(CH_3)_2Si(OC_2H_5)_2$, and 12 parts by mass of a silane compound of a formula: $H_2NC_2H_4NHC_3H_6Si(OCH_3)_3$, and was mixed uniformly under a moisture-free state to prepare a curing composition.

EXAMPLE 7

60 Parts by mass of polydimethylsiloxane, which was capped with hydroxyl groups at molecular chain termini (viscosity: 1 Pa·s, an amount of the hydroxyl groups 0.08 mmol/g), was added with 40 parts by mass of zinc carbonate and 50 ppm of chloroplatinic acid (in terms of the platinum content), and was mixed uniformly to prepare a base composition. Further, 1.2 parts by mass of di-n-butyltin dilaurate was added with 49 parts by mass of a partially hydrolyzed condensate (having 7 Si atoms) of a silane compound of a formula: $Si(OC_2H_5)_4$, 37.8 parts by mass of a silane compound of a formula: $(CH_3)_2Si(OCH_3)_2$, and 12 parts by mass of a silane compound of a formula: $H_2NC_2H_4NHC_3H_6Si(OCH_3)_3$, and was mixed uniformly under a moisture-free state to prepare a curing composition.

EXAMPLE 8

60 Parts by mass of polydimethylsiloxane, which was capped with hydroxyl groups at molecular chain termini (viscosity: 1 Pa·s, an amount of the hydroxyl groups 0.08 mmol/g), was added with 40 parts by mass of zinc carbonate and 50 ppm of chloroplatinic acid (in terms of the platinum content), and was mixed uniformly to prepare a base composition. Further, 1.8 parts by mass of di-n-butyltin dilaurate was added with 53.2 parts by mass of a partially hydrolyzed condensate (having 5 Si atoms) of a silane compound of a formula: $Si(OC_2H_5)_4$, 36 parts by mass of a silane compound of a formula: $(CH_3)_2Si(OC_2H_5)_2$, and 9 parts by mass of a silane compound of a formula: $H_2NC_2H_4NHC_3H_6Si(OCH_3)_3$, and was mixed uniformly under a moisture-free state to prepare a curing composition.

EXAMPLE 9

60 Parts by mass of polydimethylsiloxane, which was capped with hydroxyl groups at molecular chain termini (viscosity: 1 Pa·s, an amount of the hydroxyl groups 0.08 mmol/g), was added with 40 parts by mass of zinc carbonate and 50 ppm of chloroplatinic acid (in terms of the platinum content), and was mixed uniformly to prepare a base composition. Further, 1.2 parts by mass of di-n-butyltin dilaurate was added with 37 parts by mass of a partially hydrolyzed condensate (having 5 Si atoms) of a silane compound of a formula: $Si(OC_2H_5)_4$, 37.8 parts by mass of a silane compound of a formula: $(CH_3)_2Si(OC_2H_5)_2$, 12 parts by mass of a silane compound of a formula: $H_2NC_2H_4NHC_3H_6Si(OCH_3)_3$, and 12 parts by mass of 1,3,5-tris (trimethoxysilylpropyl) isocyanurate, and was mixed uniformly under a moisture-free state to prepare a curing composition.

EXAMPLE 10

60 Parts by mass of polydimethylsiloxane, which was capped with hydroxyl groups at molecular chain termini (viscosity: 1 Pa·s, an amount of the hydroxyl groups 0.08 mmol/g), was added with 6 parts by mass of polydimethylsiloxane, which was capped with trimethylsilyl groups at molecular chain termini (viscosity: 0.1 Pa·s), 34 parts by mass of zinc carbonate and 50 ppm of chloroplatinic acid (in terms of the platinum content), and was mixed uniformly to prepare a base composition. Further, 1.2 parts by mass of di-n-butyltin dilaurate was added with 49 parts by mass of a partially hydrolyzed condensate (having 5 Si atoms) of a silane compound of a formula: $Si(OC_2H_5)_4$, 37.8 parts by mass of a silane compound of a formula: $(CH_3)_2Si(OC_2H_5)_2$, and 12 parts by mass of a silane compound of a formula: $H_2NC_2H_4NHC_3H_6Si(OCH_3)_3$, and was mixed uniformly under a moisture-free state to prepare a curing composition.

The base compositions were mixed with the curing compositions prepared in the above-described examples 6 to 10 at the ratios shown in Table 2. Their curability, flame retardancy, and adhesiveness were evaluated in the same manner as described in the example 1. The results are shown in Table 2.

TABLE 2

|  |  | example 6 | example 7 | example 8 | example 9 | example 10 |
|---|---|---|---|---|---|---|
| base composition | hydroxyl group-capped polydimethylsiloxane | 60 | 60 | 60 | 60 | 60 |
|  | trimethylsilyl group-capped polydimethylsiloxane | — | — | — | — | 6 |

TABLE 2-continued

|  |  |  | example 6 | example 7 | example 8 | example 9 | example 10 |
|---|---|---|---|---|---|---|---|
| curing composition | zinc carbonate |  | 40 | 40 | 40 | 40 | 34 |
|  | chloroplatinic acid (in terms of the platinum content) (ppm) |  | 50 | 50 | 50 | 50 | 50 |
|  | di-N-butyltin dilaurate |  | 1.2 | 1.2 | 1.8 | 1.2 | 1.2 |
|  | $(CH_3O)_3SiC_3H_6NHC_2H_4NH_2$ |  | 12 | 12 | 9 | 12 | 12 |
|  | partially hydrolyzed condensate (5 Si atoms) of $Si(OC_2H_5)_4$ |  | 49 | — | 53.2 | 37 | 49 |
|  | partially hydrolyzed condensate (7 Si atoms) of $Si(OC_2H_5)_4$ |  | — | 49 | — | — | — |
|  | $(CH_3)_2Si(OC_2H_5)_2$ |  | 37.8 | — | 36 | 37.8 | 37.8 |
|  | $(CH_3)_2Si(OCH_3)_2$ |  | — | 37.8 | — | — | — |
|  | $Si(OC_2H_5)_4$ |  | — | — | — | — | — |
|  | $CH_3Si(OC_2H_5)_3$ |  | — | — | — | — | — |
|  | 1,3,5-tris(trimethoxysilyl propyl)isocyanurate |  | — | — | — | 12 | — |
| compounding ratio | base composition:curing composition (mass ratio) |  | 100:5 | 100:5 | 100:3.5 | 100:5 | 100:5 |
| characteristic evaluation | curability | after 2 hours | rubber | rubber | rubber | rubber | rubber |
|  |  | after 4 hours | rubber | rubber | rubber | rubber | rubber |
|  |  | After 8 hours | rubber | rubber | rubber | rubber | rubber |
|  | flame retardancy [UL-94V] | maximum combustion time (sec) | 3 | 4 | 2 | 5 | 5 |
|  |  | total combustion time (sec) | 13 | 15 | 10 | 15 | 18 |
|  |  | rating | V-0 | V-0 | V-0 | V-0 | V-0 |
|  | adhesiveness [cohesion failure ratio (%)] | PBT | 90 | 90 | 90 | 100 | 100 |
|  |  | PPE | 80 | 90 | 80 | 100 | 100 |

Unit of numerical values in composition columns is part by mass.

As is apparent in Table 2, the compositions of the examples 6 to 10 prepared as the two-component type were also excellent in curability, flame retardancy, and adhesiveness. In particular, adhesiveness was improved.

It goes without saying that the present invention is not limited at all to the embodiments and examples described above, and can be embodied in various forms within a range not departing from the spirit of the present invention.

This application is based upon and claims the benefit of priority from the prior Japanese Patent Application No. 2007-327487, filed on Dec. 19, 2007; the entire contents of which are incorporated herein by reference.

Industrial Applicability

The room-temperature-curable polyorganosiloxane composition according to the present invention is stable under a hermetic condition free from moisture. It cures at room temperature into a rubber-like elastic body when in contact with moisture in the air. In particular, according to the present invention, it is possible to obtain a room-temperature-curable polyorganosiloxane composition superior in adhesiveness to conventional products. Therefore, the composition of the present invention is useful as an elastic adhesive, a coating material, a potting material, and the like for electric and electronic devices, and is also useful as an in-situ molded gasket, a building sealant, and the like.

What is claimed is:

1. A room-temperature-curable polyorganosiloxane composition, comprising:
   (A) 100 parts by mass of polyorganosiloxane capped with hydroxyl groups at molecular chain termini and having a viscosity at 23° C. of 0.02 to 1000 Pa·s;
   (B) 1 to 200 parts by mass of a filler capable of imparting flame retardancy;
   (C) 0.1 to 10 parts by mass of a partially hydrolyzed condensate of a silane compound of a general formula (1):

$$R^1{}_aSi(OR^2)_{4-a} \quad (1)$$

wherein $R^1$('s) and $R^2$('s) independently represents substituted or unsubstituted univalent hydrocarbon group, and 'a' represents a numerical value in the range of $0 \leq a \leq 0.2$ on average;

(D) 0.1 to 10 parts by mass of a silane compound of a general formula (2):

$$R^3{}_2Si(OR^4)_2 \quad (2)$$

wherein $R^3$'s and $R^4$'s independently represent a substituted or unsubstituted univalent hydrocarbon group, or a partially hydrolyzed condensate of the silane compound having 3 or less Si atoms in its molecule;

(E) 0.1 to 10 parts by mass of an amine-functionalized silane compound of a general formula (3):

$$(R^5O)_3Si{-}R^6{-}NH{-}R^7 \quad (3)$$

wherein $R^5$'s independently represent a substituted or unsubstituted univalent hydrocarbon group, $R^6$ represents a substituted or unsubstituted bivalent organic group, and R7 represents a hydrogen atom, a substituted or unsubstituted univalent hydrocarbon group, or an aminoalkyl group;

(F) 0.001 to 10 parts by mass of a curing catalyst; and
   (G) 1 to 1000 ppm of a platinum compound (in terms of the platinum content),
   wherein the (D) component contains 0.1 to 15 mols of the $OR^4$ group per mol of the $OR^2$ group in the (C) component.

2. The room-temperature-curable polyorganosiloxane composition according to claim 1,
   wherein the (C) component contains 1 to 15 mols of the $OR^2$ group per mol of the hydroxyl group in the (A) component.

3. The room-temperature-curable polyorganosiloxane composition according to claim 1,
   wherein the (B) component contains zinc carbonate.

4. The room-temperature-curable polyorganosiloxane composition according to claim 1,
   wherein the composition is a 2-package type composition, being prepared by mixing a base composition composed of the (A), (B), and (G) components and a curing composition composed of the (C), (D), (E), and (F) components.

* * * * *